United States Patent [19]

Yamada

[11] Patent Number: 5,548,885
[45] Date of Patent: Aug. 27, 1996

[54] METHOD OF MANUFACTURING STATOR FOR STEPPING MOTOR

[75] Inventor: Takahisa Yamada, Sagamihara, Japan

[73] Assignees: Canon Seiki Kabushiki Kaisha; Canon Kabushiki Kaisha, both of Tokyo, Japan

[21] Appl. No.: 218,255

[22] Filed: Mar. 28, 1994

[51] Int. Cl.$^6$ ...................................................... H02K 15/02
[52] U.S. Cl. .................................. 29/596; 72/332; 72/348; 310/42; 310/49 R; 310/263
[58] Field of Search ........................ 29/596, 598; 72/332, 72/348; 310/42, 49 R, 162, 163, 257, 263

[56] References Cited

U.S. PATENT DOCUMENTS 1,728,033  9/1929  Blake et al. .
4,418,471  12/1983  Torii et al. .

FOREIGN PATENT DOCUMENTS 57-211964  12/1982  Japan .
353854     8/1991   Japan .
1055201    1/1967   United Kingdom .
2051628    1/1981   United Kingdom .

OTHER PUBLICATIONS

Patent Abstracts of Japan, vol. 7, No. 107, published May 11, 1983, which is an English Abstract of Japanese Patent Nos. 58-29351, 58-29350, published Feb. 21, 1983.

Primary Examiner—Carl E. Hall
Attorney, Agent, or Firm—Fitzpatrick, Cella, Harper & Scinto

[57] ABSTRACT

A method of forming a stator for a stepping motor, including the steps of forming comb teeth by cutting a flat section of a plate having a cylindrical section around the flat section and bending the comb teeth up to a first angle. Next, the comb teeth are bent up to a second angle larger than the first angle and the thickness of the comb teeth is reduced so as to render uniform the thickness of all the comb teeth. Then, the cylindrical section is subjected to a drawing process at least one time. Finally, the comb teeth are bent up to a right angle. As a result, the occurrence of cambers in the comb teeth is eliminated and the comb teeth are not inclined in the peripheral direction. Also, the accuracy with which the comb teeth are bent to a right angle can be improved thereby.

9 Claims, 8 Drawing Sheets

1ST DRAWING

CUTTING & BENDING

45° BENDING

80° BENDING

2ND DRAWING

3RD DRAWING

90° BENDING

METHOD OF MANUFACTURING STATOR FOR STEPPING MOTOR

BACKGROUND OF THE INVENTION

1. Field of the Invention

The present invention relates to a method of manufacturing a stator for a stepping motor and more particularly to a method of manufacturing a stator for a micro stepping motor whose outer cylindrical section has the diameter of 30 mm or less or a stator for a small size stepping motor having an outer cylindrical section drawn deeply.

2. Related Background Art

Generally, a stepping motor has, as shown in FIG. 1, a rotor 1, a shaft 2 and stators $3_1$, $3_2$, $4_1$ and $4_2$. The stators $3_1$, $3_2$, $4_1$ and $4_2$ are each formed with a plurality of magnetic pole teeth (comb teeth) 3a, 3b, 4a or 4b at regular intervals in the peripheral direction. It is preferable to form the length of the comb teeth 3a, 3b, 4a and 4b long in order to increase the effective magnetic flux generated by the excitation of excitation coils 5a and 5b. However, when the comb teeth are formed by simply blanking the center of a single frame plate as is conventional, the length of the comb teeth becomes less than half the blanking diameter, limiting the ability to obtain large effective magnetic flux. Although Japanese Patent Publication No. 57-211964 discloses a method for solving the above problem, a study was made to investigate a further problem upon manufacturing and a method was proposed in a United States Patent Application filed on Mar. 1, 1994.

However, when the stepping motor is formed to be a micromotor or the outer cylindrical section of the stepping motor is manufactured by a drawing process, the above methods are not used very much, since the outer cylindrical section is shaped so as to be elongated to a great extent as shown in FIGS. 3 to 5. Such a method wherein the cylindrical section is so elongated has been proposed in Japanese Patent Publication No. 3-53854.

In this method, as shown in cross section in FIG. 12A, first, a frame plate 10 is subjected to a drawing process to form a cylindrical section 14 on the outer periphery of a flat section 12 such that the diameter of the flat section 12 becomes $D_1$. Next, as shown in FIG. 12B, a plurality of comb teeth 16 are cut from the flat section 12 and raised from the flat section 12 at a right angle such that the inside diameter of a concentric circle drawn by the root portions of the comb teeth becomes $d_1$ and tips of the comb teeth are located close to the outer periphery of the flat portion 12. Next, as shown in FIG. 12C, the cylindrical section 14 is further subjected to a drawing process to make the diameter of the flat section 12 becomes $D_2$. Finally, as shown in FIG. 12D, the cylindrical section 14 is subjected to a final drawing process to make the diameter of the flat section 12 be $D_3$ and simultaneously the lower portion of the cylindrical section 14 is bent at a right angle thereby to complete formation of a stator. According to this method, it is possible to make the length of the comb teeth equal to or more than half the value obtained by subtracting the inside diameter $d_1$ of the concentric circle of the comb teeth from the diameter $D_3$ of the flat portion 12.

However, there are following problems in the above conventional method.

(1) The cutting and raising process is performed such that while the plate is supported by a die from underneath, a punch is lowered to punch the plate to form the comb teeth and the punch is further lowered until the comb teeth are brought into contact with the peripheral surface of the die to be raised at a right angle. Also, the punch is formed such that it is first brought into contact with a portion of the flat section 12 closer to the cylindrical section 14 and thereafter is gradually brought into contact with inner portions of the flat portion 12. Therefore, the force applied to the comb teeth during the cutting and raising process is shifted gradually from the tips of the comb teeth to the root portions thereof. As a result, distortions occur in the comb teeth. Then, after the cutting and raising process, cambers are produced on the comb teeth 16, as indicated by the broken line in FIG. 13, which are different from an ideally straight shape, as indicated by the solid line in FIG. 13. The occurrence of the cambers causes the power of a motor in which such a stator is used to be lowered. Especially, when there are variations in the shapes of the cambers of the comb teeth, the power of the motor is further lowered.

(2) Also, in the cutting and raising process, if there is a problem in the intensity of the die when the cutting and raising of all the comb teeth are performed, the cutting and raising are performed two or three times. In this case, after the first cutting and raising process, spaces are formed in the flat portion, where some comb teeth are cut and raised. Then, in the second cutting and raising process, a force (in the peripheral direction) directed to the spaces is generated, which causes comb teeth for the second cutting and raising process to be distorted in the peripheral direction, as indicated by the broken line in FIG. 14, so that their shape is different from the ideal shape as indicated by the solid line in FIG. 14. That is, the the comb teeth are inclined in the peripheral direction. When the resultant stator constitutes a stepping motor, such inclination of the comb teeth in the peripheral direction causes variations in calculating the step angles, resulting in the decrease in the positioning accuracy.

(3) Also, although a surface treated steel sheet is utilized as the material of the plate 10, there are variations in thickness of the surface treated steel sheet due to the rolling characteristics thereof. For example, usually, there is about a 4% maximum difference in thickness in the width and rolling directions of the sheet (FIG. 15). When such a plate with variations in thickness is subjected to the cutting and raising process to form the comb teeth, the squareness or right angle accuracy in forming a right angle with the comb teeth with respect to flat section 12 is lowered, reducing the power of any motor made from a stator using such a sheet.

(4) When the drawing process is conducted after the cutting and raising process, a force is applied to the raised comb teeth during the drawing process, which causes the comb teeth to be distorted in the radial or peripheral direction.

SUMMARY OF THE INVENTION

It is therefore an object of the present invention to provide a method of manufacturing a stator for a stepping motor in which the above problems occurring during the cutting and raising process are solved.

For achieving the above and other objects, a method of manufacturing a stator for a stepping motor according to the present invention, comprises the steps of: cutting a flat section of a plate formed with a cylindrical section around the flat section and bending the comb teeth up to a first angle; the bending and thickness reducing process for bending the comb teeth up to a second angle larger than the first angle and reducing the thicknesses of the comb teeth so as to be uniform; the drawing process for drawing the cylindrical section at least one time; and the bending process for bending the comb teeth up to a right angle.

DETAILED DESCRIPTION OF THE PREFERRED EMBODIMENTS

An embodiment of the present invention will be described with reference to the accompanying drawings. First, the entire structure of a stepping motor will be described with reference to FIGS. 1 to 5.

Figure 1:
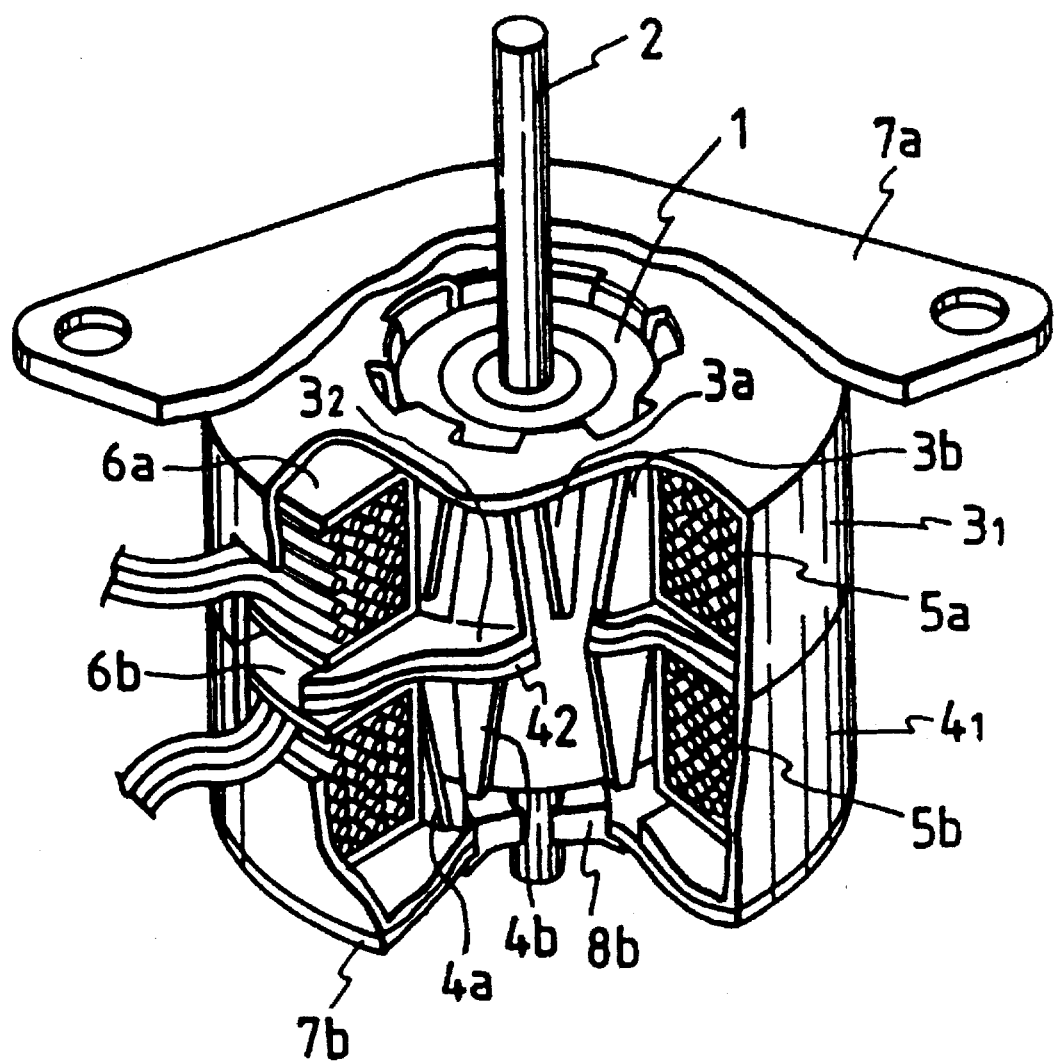
FIG. 1 is a partly broken away perspective view of a stepping motor.

In FIG. 1, a rotor 1 of the stepping motor has a shaft 2 fixed thereto. Two upper and lower stators $3_1$, $3_2$ are disposed around the rotor 1. Also, two upper and lower stators $4_1$, $4_2$ are disposed around the rotor 1 under the stators $3_1$, $3_2$. The stators $3_1$, $3_2$ are provided on the inner peripheral portions with respective comb teeth 3a, 3b such that the comb teeth 3a are opposite from the comb teeth 3b. Also, the stators $4_1$, $4_2$ are provided on the inner peripheral portions with respective comb teeth 4a, 4b such that the comb teeth 4a are opposite from the comb teeth 4b. The comb teeth 3a, 3b are formed so as to have the north and south poles alternately in the peripheral direction. The construction of the comb teeth 4a, 4b are the same as that of the comb teeth 3a, 3b. Hollow portions of the stators $3_1$, $3_2$ and $4_1$, $4_2$ are provided with bobbins 6a, 6b which have respective excitation coils 5a, 5b wound with many turns. Flanges 7a, 7b are welded to the respective stators $3_1$, $4_1$ and formed with respective bearings 8a, 8b for supporting the shaft 2 of the rotor 1.

Figure 2:
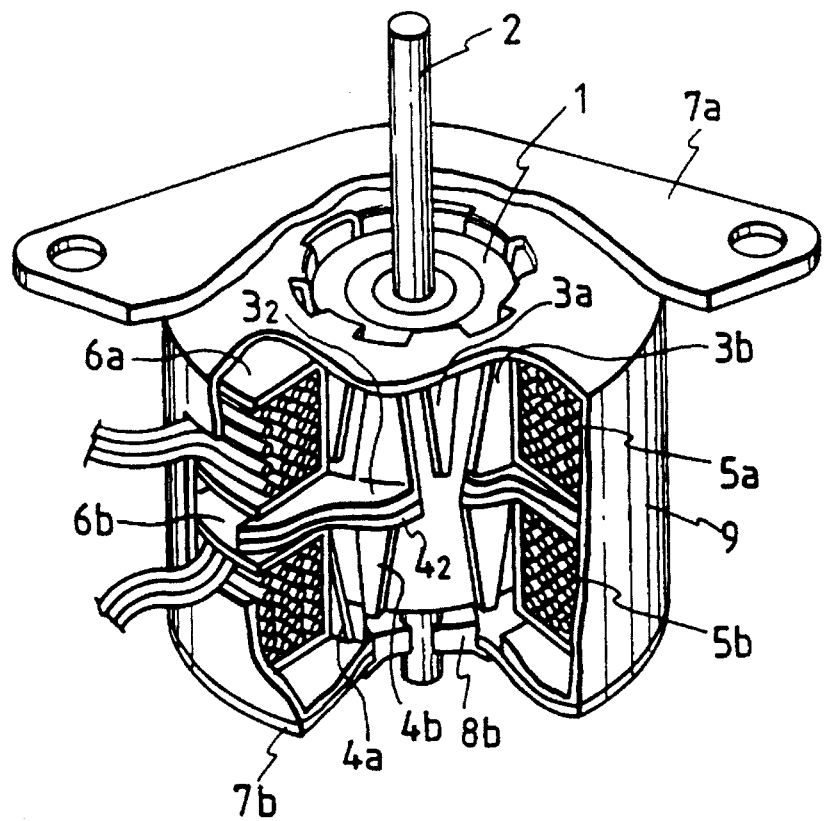
FIG. 2 is a partly broken away perspective view of a stepping motor formed by performing a drawing the outer cylindrical section of the motor of FIG. 1.
Figure 3:
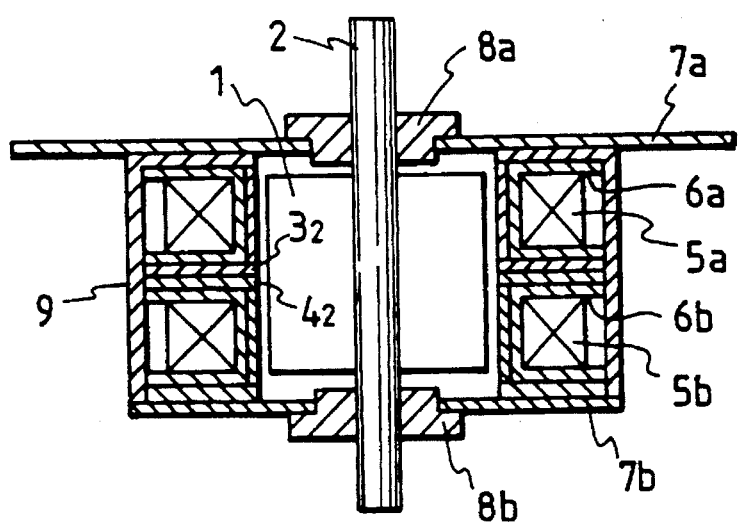
FIG. 3 is a cross-sectional view of the motor shown in FIG. 2.
Figure 4:
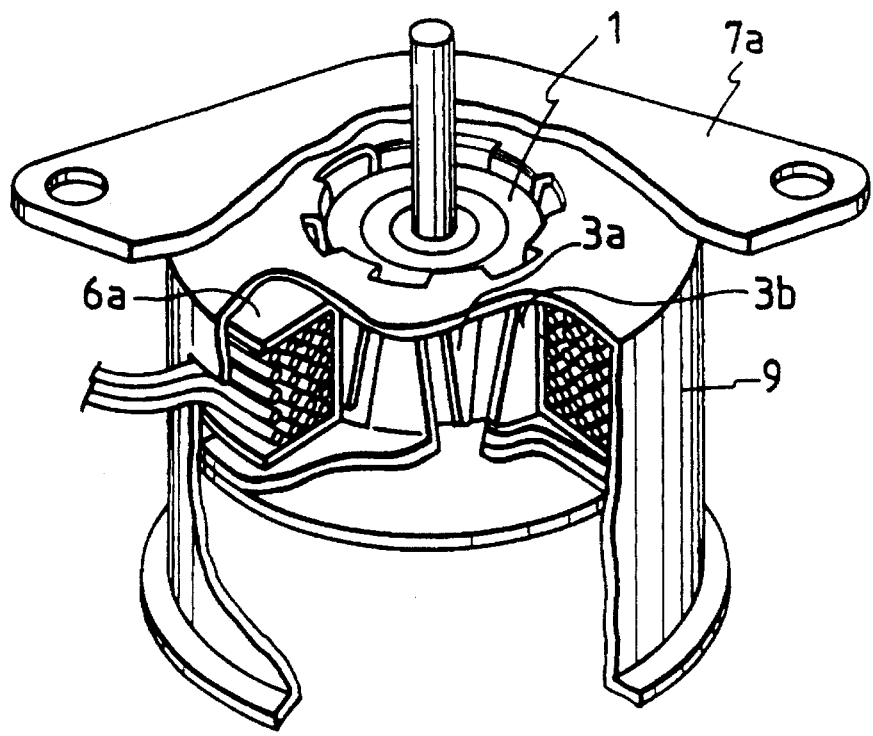
FIG. 4 is a partly broken away perspective view of a stepping motor manufactured by substantially elongated the outer cylindrical section of the motor shown in FIG. 1 and integrating the coils thereof.
Figure 5:
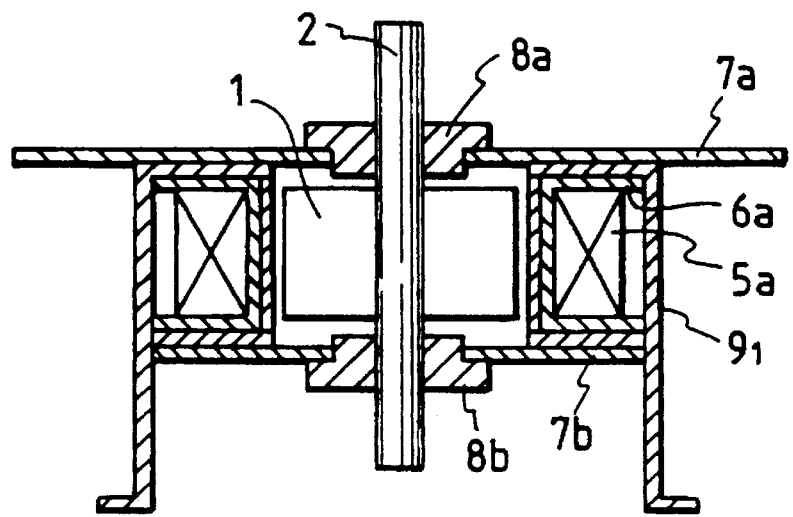
FIG. 5 is a cross-sectional view of the motor in FIG. 4.

However, when the stepping motor is formed so as to be a micromotor or the outer cylindrical section of the stepping motor is subjected to a drawing process to substantially elongate the outer cylindrical section, it is necessary to integrate the stators $3_1$ and $4_1$ of FIG. 1 into a stator 9 of FIGS. 2 to 5. Although thus, the stator 9 of FIG. 2 is formed by integrating the stators of FIG. 1, not only the stators but also the coils are integrated in FIG. 4.

Next, a method of forming the stator 9 will be described. FIGS. 6A to 6G show the processes for forming the stator 9 for the stepping motor and FIGS. 7 to 11 show diagrams for explaining members to be used in the chief processes of forming the stator 9 and the operations of the members.

Figure 6A:
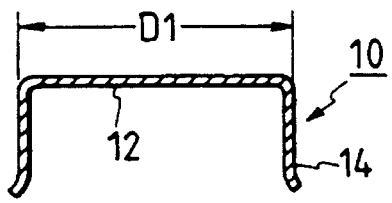
FIGS. 6A to 6G show schematic views of the processes of manufacturing a stator for a stepping motor according to an embodiment of the present invention.

First, as shown in FIG. 6A, the first drawing process is performed on a plate 10 to form a flat section 12 with the diameter $D_1$ and a cylindrical section 14 around the outer periphery of the flat section 12. This process is performed in a similar manner to the conventional process.

Figure 6B:
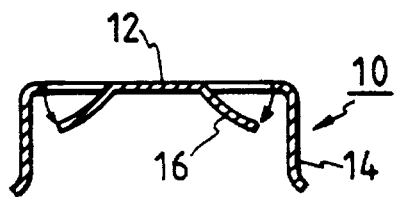

Next, as shown in FIG. 6B, a cutting and bending process is performed to form comb teeth 16. At this time, the flat section 12 is cut to form comb teeth 16 and the comb teeth are bent only at a predetermined small angle (at an angle in a range of, e.g., 10° to 40°) which is different from the conventional cutting and raising process (where a flat section is cut to form comb teeth and the comb teeth are raised at a right angle). Therefore, although the entire comb teeth 16 are bent at one time, there is no problem concerning the intensity of a die and no inclination of the comb teeth 16 in the peripheral direction occurs. This is different from the conventional cutting and raising process in which the the comb teeth become inclined in the peripheral direction since the comb teeth are divided into a few groups and then bent two times or three times.

Figure 6C:
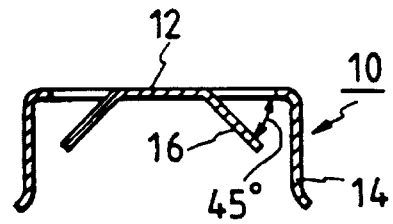

Next, as shown in FIG. 6C, the comb teeth 16 are further bent up to, e.g., 45°. Simultaneously, the thickness of the comb teeth 16 are reduced about 10%. In this 45° bending and teeth thickness reducing process, as a punch and die both with respective linear processing surfaces are utilized, the cambers of the comb teeth 16 produced in the previous cutting and bending process as shown in FIG. 6B are corrected to make the comb teeth 16 straight. Also, the thickness of the comb teeth 16 are made uniform.

Figure 6D:
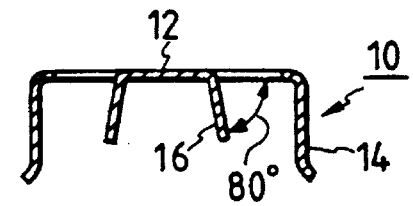

Then, as shown in FIG. 6D, the comb teeth 16 are bent further from about 45° up to about 80°. This 80° bending is for the purpose of making large the width of the upper cylindrical section of a drawing punch to be used in the following second drawing process so as to prevent the drawing punch from lacking the proper force to perform the subsequent drawing process.

Figure 6E:
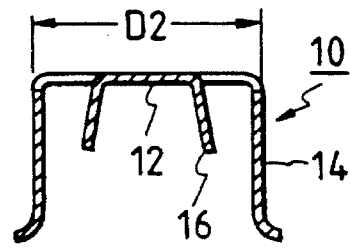

Next, as shown in FIG. 6E, the second drawing process is performed to make the diameter of the flat section 12 be $D_2$.

Figure 6F:
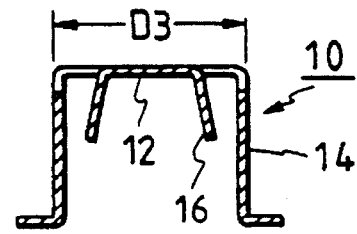

Next, as shown in FIG. 6F, the third drawing process is performed to make the diameter of the flat section 12 to be $D_3$ as well as to bend the lower portion of the cylindrical section 14 at a right angle with respect to the cylindrical section 14.

Figure 6G:
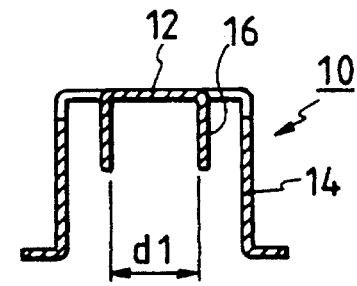

Finally, as shown in FIG. 6G, the 90% bending process is performed to bend the comb teeth 16 up to 90°, i.e., a right angle, thereby making the inside diameter of concentric circles of the comb teeth 16 to be $d_1$. Although a change in the bending angle of the comb teeth occurs during the drawing process after the cutting and 90° raising process in the conventional method, it will not occur in this 90° bending process since the 90° bending process is performed finally. Also, since the thicknesses of the respective comb teeth 16 are made uniform in the above-described 45° bending and teeth thickness reducing process, uniform forces are applied to the respective comb teeth 16 in the 90° bending process. As a result, variations in the accuracy with which the comb teeth 16 are bent 90° can be reduced.

Figure 7:
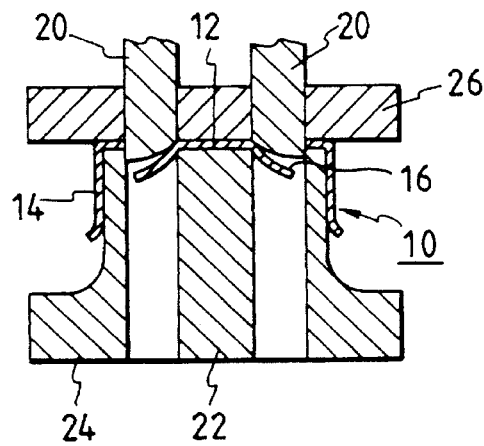
FIG. 7 is a cross-sectional view of part of the motor for explaining the cutting and bending process in FIG. 6B.

Next, the members to be used in the chief processes and the operations of the members will be described with reference to FIGS. 7 to 11. FIG. 7 is a cross-sectional view showing the cutting and bending process corresponding to FIG. 6B. A cutting die 24 is disposed inside the cylindrical section 14 formed in the first drawing process. And, the cutting die 24 is brought into contact with the outer peripheral portion of the flat section 12 of the plate 10 to support the flat section 12. A bending die 22 is disposed in the center of the cutting die 24 so as to support the middle portion of the flat section 12. Under these conditions, a cutting punch 20 is lowered to cut the flat section 12 to form the comb teeth 16 and simultaneously to bend the comb teeth 16 to a certain degree (at an angle of 10° to 40°). A numeral number 26 represents a stopper.

Figure 8:
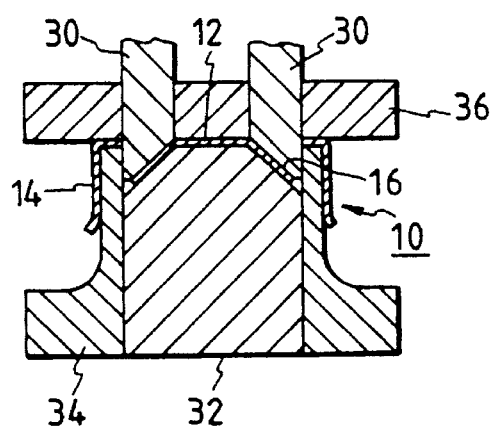
FIG. 8 is a cross-sectional view of part of the motor for explaining the 45° bending and thickness reducing process in FIG. 6C.

FIG. 8 is a cross-sectional view of part of the motor showing the 45° bending and teeth thickness reducing process corresponding to FIG. 6C. As shown in FIG. 8, while the plate 10 is supported by a supporting die 34 and a bending die 32, a bending punch 30 is lowered to perform the bending and teeth thickness reducing process. As is apparent from FIG. 8, in this process, the bending die 32 with a linear surface bent at 45° and the bending punch 30 with a linear surface bent at 45° are utilized. Therefore, the comb teeth 16 are bent at 45° and become straight. Also, as the respective comb teeth 16 are pressed by the same force, it is possible to reduce the thicknesses of the comb teeth 16 equally about 10%. A numeral number 36 is a stopper.

Figure 9:
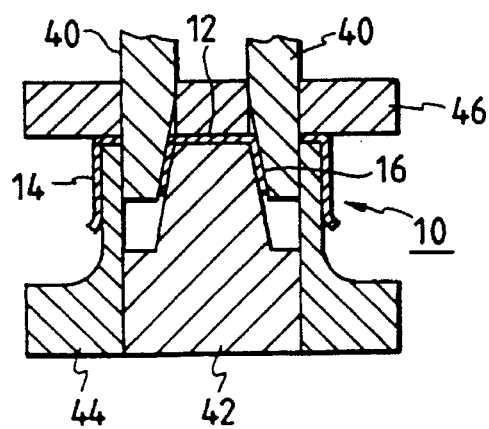
FIG. 9 is a cross-sectional view of part of the motor for explaining the 80° bending process in FIG. 6D.

FIG. 9 is a cross-sectional view showing the 80° bending process corresponding to FIG. 6D. As shown in FIG. 9, while the plate 10 is supported by a supporting die 44 and a bending die 42, a bending punch 40 is lowered to perform the 80° bending process. As is apparent from FIG. 9, in this process, the bending die 42 with a linear processing surface bent at 80° and the bending punch 40 with a linear processing surface bent at 80° are utilized. A numeral number 46 represents a stopper. This process is performed for the purpose of enabling the insertion of a drawing punch used in the next drawing process into the cylindrical section 14 easily by enlarging the distance between the cylindrical section 14 and the comb teeth 16. When, for example, a 60° bending and teeth thickness reducing process is performed instead of the 45° bending and teeth thickness reducing process, the distance between the comb teeth 16 and the cylindrical section 14 is enlarged sufficiently to accommodate the drawing punch used in the next drawing process. Thus, the 80° bending process can be omitted.

Figure 10:
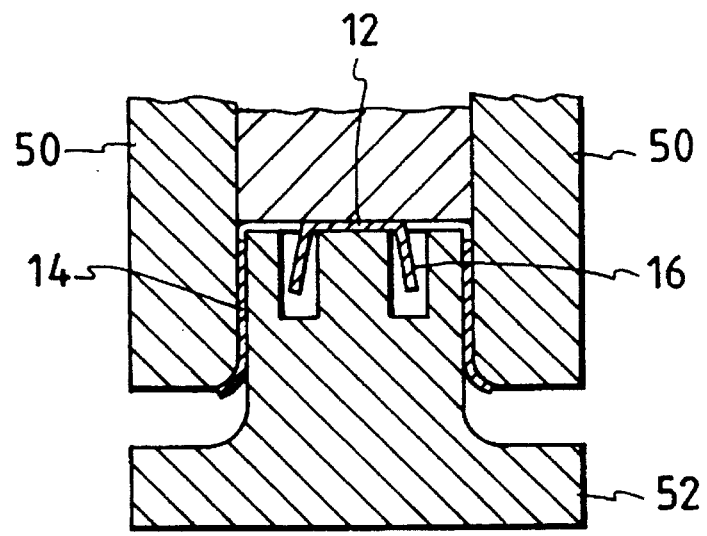
FIG. 10 is a cross-sectional view of part of the motor for explaining the second drawing process in FIG. 6E.

FIG. 10 is a cross-sectional view showing the second drawing process corresponding to FIG. 6E. As shown in FIG. 10, while the plate 10 is supported by a drawing punch 52, a drawing die 50 is operated from above to draw the cylindrical section 14 of the plate 10.

Figure 11:
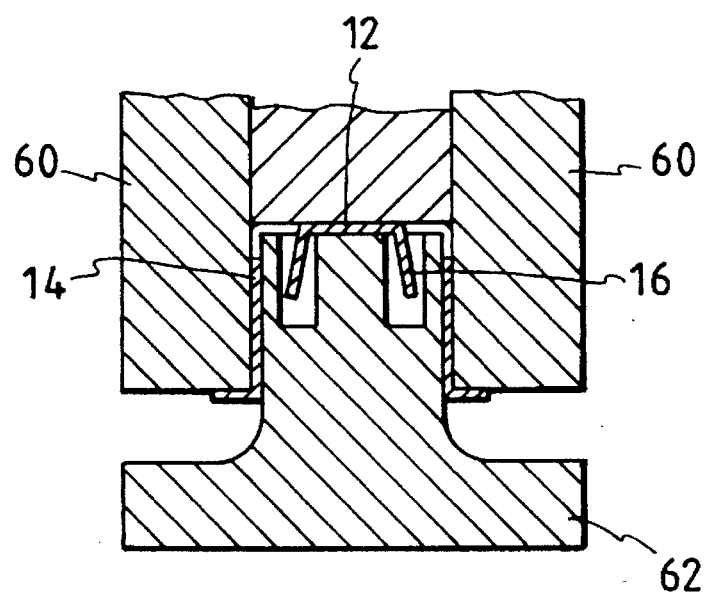
FIG. 11 is a cross-sectional view of part of the motor for explaining the third drawing process in FIG. 6F.
Figure 12A:
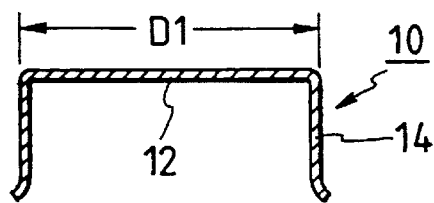
FIGS. 12A to 12D are schematic views of an outer cylindrical section of a motor which show the process of forming a conventional stator for a stepping motor.
Figure 12B:
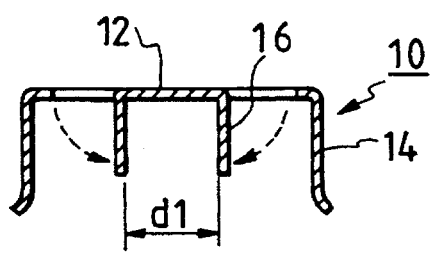
Figure 12C:
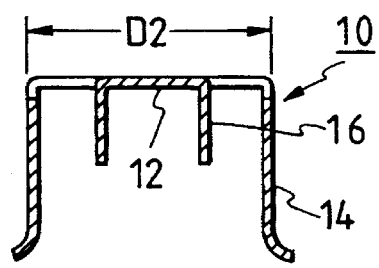
Figure 12D:
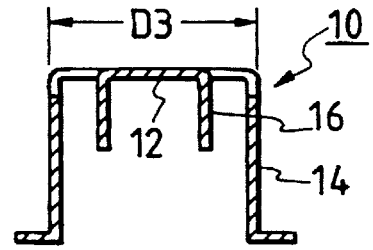
Figure 13:
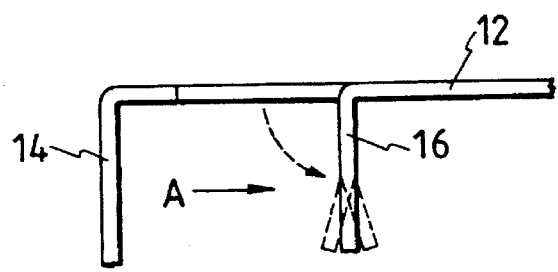
FIG. 13 is a cross-sectional view of another cylindrical section of a motor for explaining a problem of the conventional method of FIGS. 12A to 12D.
Figure 14:
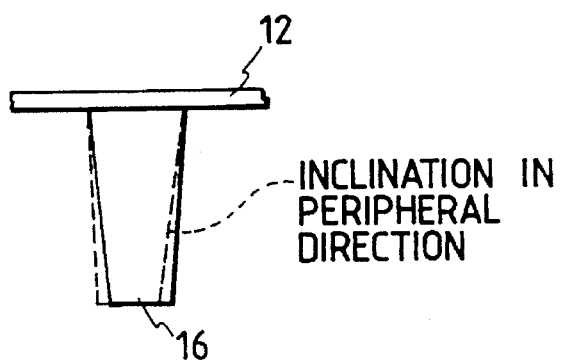
FIG. 14 is a schematic diagram for explaining distortions of the comb teeth in the peripheral direction occurring in the punching process shown in FIG. 12B.
Figure 15:
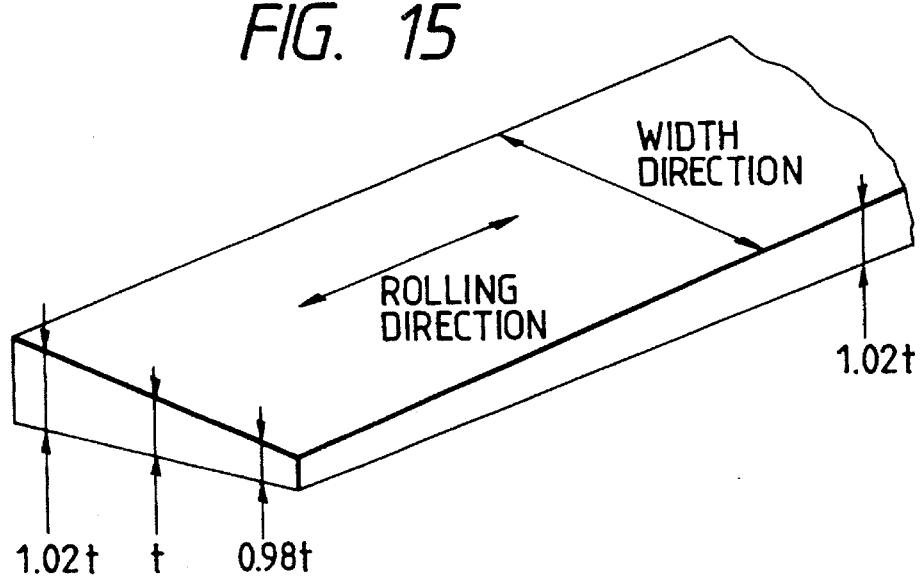
FIG. 15 is a perspective view showing a surface treated steel sheet used as the material for the plate.

FIG. 11 is a cross-sectional view showing the third drawing process corresponding to FIG. 6F. As shown in FIG. 11, while the plate 10 is supported by a drawing punch 62, a drawing die 60 is operated from above to draw the cylindrical section 14 of the plate 10 as well as to bend a lower portion of the cylindrical section 14 at a right angle.

Finally, although not shown, the comb teeth 16 are bent up to 90°, i.e., a right angle. In this 90° bending process, a bending die and a bending punch similar to those shown in FIG. 9 are utilized. However, the bending die has a 90° processing surface perpendicular to the flat section 12 of the plate 10 while the bending punch has a 90° processing surface corresponding to the processing surface of the bending die.

The result of the tests which were carried out to check the effect of the forming method according to the present invention will be described below.

Test Results (1) The cambers of the comb teeth in the conventional method were 0.05 mm while those of the comb teeth in the method of the present invention were substantially zero.

(2) The accuracy of the diameter $d_1$ of concentric circles drawn by the comb teeth was improved.

(3) The inclination of the comb teeth in the peripheral direction in the conventional method was ±1° (degree) while the inclination of the comb teeth in the peripheral direction using the method of the present invention was ±10' (minute).

(4) The degree to which concentric circles drawn through the cylindrical section and the comb teeth in the conventional method are coaxial was 0.1 mm while the degree to which concentric circles drawn through the cylindrical section and the comb teeth in the method of the present invention are coaxial was 0.03 mm.

As described above, according to the present invention, the cutting and bending process and the 45° bending and teeth thickness reducing process are used in addition to the cutting and raising process, so that the cambers of the comb teeth and the inclination of the comb teeth in the peripheral direction can be reduced and the ability to provide comb teeth bent at 90° can be also improved. Further, since the 90° bending process is performed after the drawing processes, the accuracy with which the comb teeth can be bent to 90° can be improved.

What is claimed is:

1. A method of manufacturing a stator for a stepping motor, comprising the steps of:

bending a plate so as to form a flat section and a cylindrical section around an outer periphery of the flat section by a first drawing process;

cutting a plurality of comb teeth from the flat portion and bending the comb teeth;

reducing the thickness of the comb teeth so as to make the thickness of the comb teeth uniform;

reducing the diameter of the cylindrical portion by a second drawing process after said thickness reducing step; and bending the comb teeth further to form a right angle with respect to the flat section.

2. A method according to claim 1, wherein said thickness reducing step includes the steps of reducing the thickness of the comb teeth so as to make the thickness of the comb teeth uniform as well as bending the comb teeth further.

3. A method according to claim 1, further comprising the step of reducing the diameter of the cylindrical section by a third drawing process after said second drawing process.

4. A method according to claim 2, further comprising the step of further bending the comb teeth bent in said thickness reducing and bending step.

5. A method according to claim 4, wherein said cutting and bending step bends the comb teeth up to an angle of 10° to 40°.

6. A method according to claim 4, wherein said thickness reducing and bending step reduces the thickness of the comb teeth about 10% and the comb teeth are bent up to an angle of about 45°.

7. A method according to claim 4, wherein said step of further bending the comb teeth bent in said thickness reducing and bending step bends the comb teeth up to an angle of about 80°.

8. A method of forming a stator for a stepping motor, comprising the steps of:

cutting comb teeth from a flat section of a plate formed with a cylindrical section around the flat portion and bending the comb teeth up to a first angle;

bending the comb teeth further up to a second angle larger than the first angle and reducing the thickness of the comb teeth so as to make the thickness of the comb teeth uniform; and subjecting the cylindrical section to a drawing process at least one time; and further bending the comb teeth up to a right angle.

9. A method according to claim 8, further comprising the step of bending the comb teeth up to a third angle larger than the second angle but smaller than a right angle after the bending and thickness reducing step.

* * * * *

UNITED STATES PATENT AND TRADEMARK OFFICE
CERTIFICATE OF CORRECTION

PATENT NO. : 5,548,885

DATED : August 27, 1996

INVENTOR(S) : TAKAHISA YAMADA

It is certified that error appears in the above-indentified patent and that said Letters Patent is hereby corrected as shown below:

ON THE COVER PAGE

Insert:

--[30] Foreign Application Priority Data
March 29, 1993   [JP]   Japan ......5-93580--

[56] References Cited

FOREIGN PATENT DOCUMENTS

"353854    8/1991    Japan." should read
--353854   3/1991    Japan--.

[57] ABSTRACT:

Line 1, "motor," should read --motor--.

COLUMN 1:

Line 52, "becomes" should read --become--.
Line 57, "formation" should read --the formation--.
Line 59, "dimaeter" should read --diameter--.

UNITED STATES PATENT AND TRADEMARK OFFICE
CERTIFICATE OF CORRECTION

PATENT NO. : 5,548,885
DATED : August 27, 1996
INVENTOR(S) : TAKAHISA YAMADA

Page 2 of 2

It is certified that error appears in the above-indentified patent and that said Letters Patent is hereby corrected as shown below:

<u>COLUMN 2</u>:

Line 34, "the the" should read --the--.

<u>COLUMN 3</u>:

Line 15, after "drawing", insert --process on--.
    Line 20, "elongated" should read --elongating--.
    Line 40, "process" should read --processes--.

<u>COLUMN 4</u>:

Line 40, "the the" should read --the--.

<u>COLUMN 5</u>:

Line 40, "about" should read --by about--.

Signed and Sealed this

Eleventh Day of March, 1997

*Attest:*

BRUCE LEHMAN

*Attesting Officer*      *Commissioner of Patents and Trademarks*